Feb. 11, 1936.  R. W. RITZERT  2,030,154
METHOD OF MAINTAINING THE FRESHNESS OF BREAD AND THE LIKE
AND APPARATUS USED IN THE PRACTICE OF THE METHOD
Filed Jan. 8, 1932  2 Sheets-Sheet 1
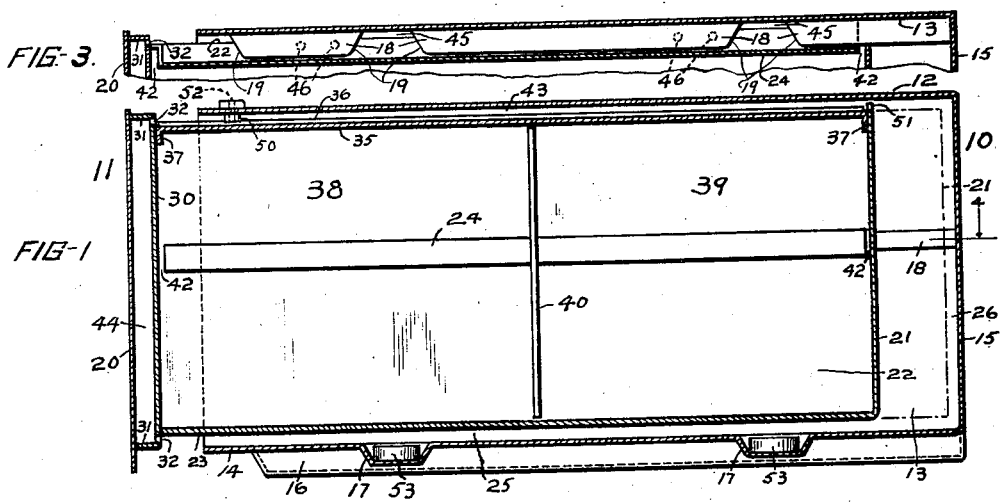
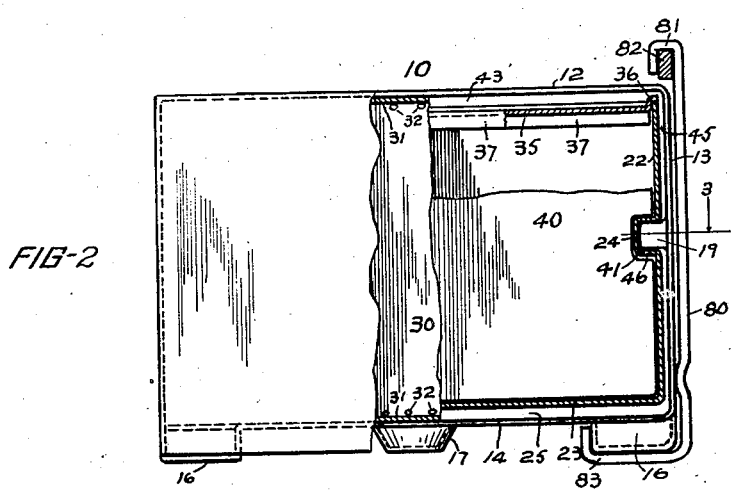
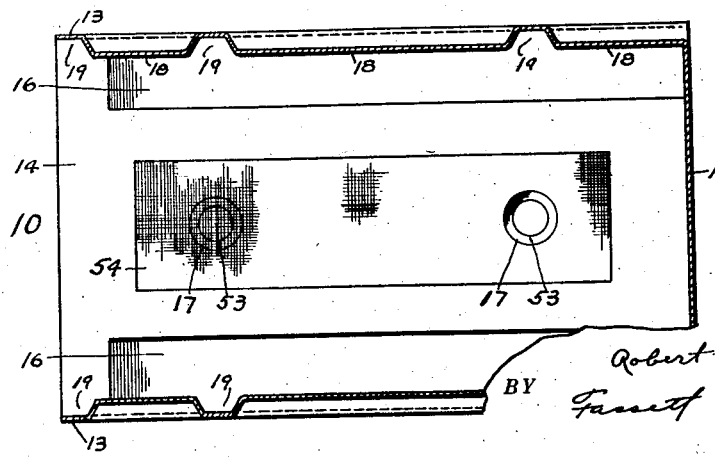

Feb. 11, 1936.     R. W. RITZERT     2,030,154
METHOD OF MAINTAINING THE FRESHNESS OF BREAD AND THE LIKE
AND APPARATUS USED IN THE PRACTICE OF THE METHOD
Filed Jan. 8, 1932     2 Sheets-Sheet 2
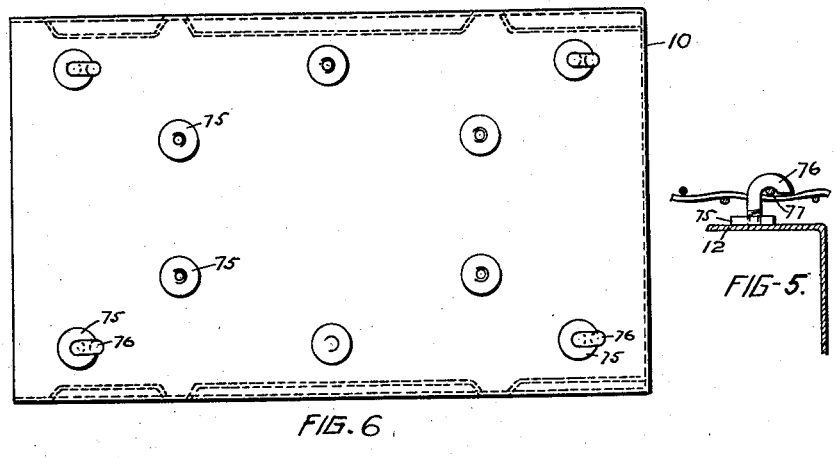
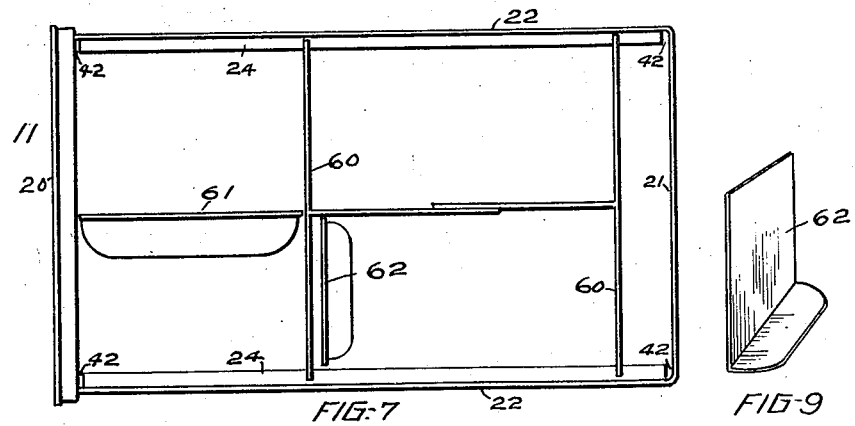
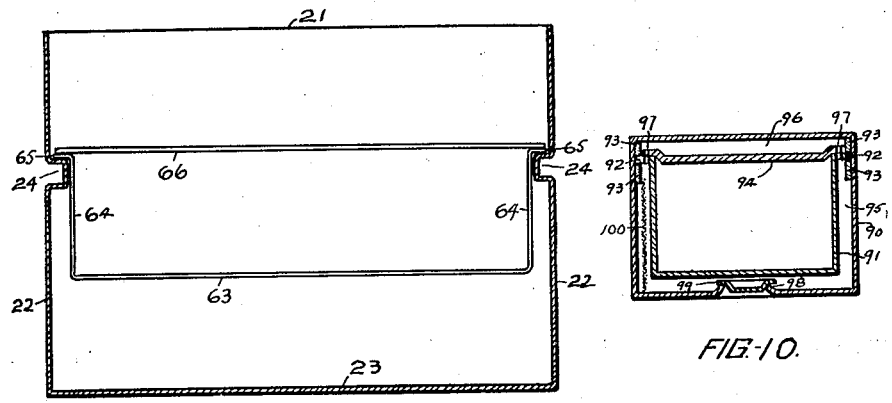

Patented Feb. 11, 1936

2,030,154

UNITED STATES PATENT OFFICE 2,030,154

METHOD OF MAINTAINING THE FRESHNESS OF BREAD AND THE LIKE, AND APPARATUS USED IN THE PRACTICE OF THE METHOD

Robert W. Ritzert, Dayton, Ohio

Application January 8, 1932, Serial No. 585,433

3 Claims. (Cl. 99—10)

This invention relates to a method of maintaining the freshness of bread, and it is to be understood that the term bread is employed in the broadest sense. That is, the term includes biscuits, muffins, cake of various kinds, crackers, pretzels, etc. In fact the term bread includes all foodstuffs made of flour or meal, and baked.

Notwithstanding much attention has been directed to the preservation of foods of various kinds, little or no thought has been given to the preservation of the freshness of bread. Consequently much loss and inconvenience has resulted. Bakers are subject to constant worry and embarrassment in their efforts to bake enough bread daily to supply the current demand, and yet have as little as possible left on their hands at the end of the day. Bread a day old is usually sold at half price, and even at that price the demand is very limited. Therefore, bread left on the baker's hands means immediate loss to him, but in the long run the consumer pays the bill.

Now that mechanical refrigeration has come into very extensive use much saving of expense is possible, to say nothing of the resulting convenience, by keeping stocks of food in the domestic refrigerator sufficient for several days or even a week or two. But no effort has been made to preserve bread by means of the refrigerator, and the housekeeper has gone on replenishing her bread supply daily.

Even from the standpoint of health no thought has been given to the preservation of bread. Notwithstanding it is well known that bread which has been baked less than 24 hours, or even 36 hours, is apt to be more or less deleterious, most bread is eaten before it is 24 hours old because of its greater palatability. Obviously, many people would eat the more wholesome three-day-old bread if its freshness and palatability could be retained till then. My method makes it possible to eat fresh bread three days old, and even older. Because of the low temperature, which is a part of my method, the propagation of germ life is retarded in the case of bread just as it is in meat and other articles of food stored in the domestic refrigerator.

I have discovered that by depositing bread in a closed container approximately the size of the mass of bread, placing said container in a second closed container enough larger than the first to leave an enveloping space therebetween, which space is kept filled with air of high humidity, said containers being kept in an atmosphere of low enough temperature to prevent the bread molding, the freshness of the bread will be maintained a relatively long time.

I shall now describe in detail my method of keeping bread fresh, and will describe certain apparatus for carrying out my method, which apparatus is illustrated in the accompanying drawings, wherein Fig. 1 is a sectional side elevation of the apparatus;

Fig. 2 is an end elevation showing parts of the drawer in section;

Fig. 3 is a sectional plan view of one side of the apparatus, taken on line 3 of Fig. 2;

Fig. 4 is a plan view of the housing 10, taken on line 4, of Fig. 1;

Fig. 5 is a view showing a fragment of a refrigerator shelf with a fragment of my apparatus attached to it;

Fig. 6 is a plan view of the housing;

Fig. 7 is a plan view of the drawer, showing methods of forming compartments for bread of various sizes and shapes;

Fig. 8 is a sectional elevation of the drawer, showing further partitioning details;

Fig. 9 is a perspective view of a partition, and

Fig. 10 is a sectional view of a modified structure.

Roughly, my apparatus consists of a rectangular housing or box, 10, closed on all sides except at one end, and a drawer 11 adapted to slide into the housing. The housing 10 includes a top 12, side walls 13—13, a bottom 14 and an end 15. The bottom is joined to the side walls by channels 16—16, which in reality form part of the bottom and afford feet for the housing to stand on. Depressions 17—17 are formed in the bottom 14 for a purpose to be explained presently. In each side wall a series of inwardly extending horizontal channels 18 is formed. In effect each of these series of channels is one continuous channel, in that it serves as a guide or cleat on which the drawer 11 slides. The purpose of interrupting the continuity of the channels, thereby forming recesses 19 (see Fig. 4), will be stated presently.

The drawer 11 comprises a front 20, back 21, side walls 22—22 and bottom 23. In each side wall a horizontal channel 24 is formed, large enough to receive the channel 18 of the corresponding wall of the housing. The drawer slides on these channels and keeps the bottom of the drawer up a short distance from the bottom 14 of the housing, leaving a space 25. The drawer is enough shorter than the housing to leave a space 26 between the end of the drawer and the end of the housing. In Fig. 1 the position of the end of the drawer when the drawer is closed is shown with a dotted line.

The front wall of the drawer serves as a sort of stopper, whereby to isolate the interior of the housing from the space outside of the housing. For this purpose the interior of the wall 20 carries a flat box, consisting of a wall 30, apposed to the wall 20, and joined thereto by walls 31, which walls lie close to the walls of the housing when the drawer is in place in the housing. Thus the open end of the housing is closed by a sort of plug. The side walls 22 and bottom 23 of the drawer abut the wall 30 at points somewhat in-set from walls 31, leaving a narrow margin of the wall 30 exposed outside of the side walls 22 and the bottom 23, which margins are provided with rows of holes 32. A similar row of holes 32 is formed in the wall 30 close to the upper horizontal wall 31 (see Figs. 1 and 2).

The drawer is provided with a cover 35, having an upwardly and outwardly extending flange 36 at each side, that lies on the upper edges of the side walls 22. At each end the cover has a depending flange 37, one of which flanges lies close to the rear wall 21, while the other lies close to the wall 30. The drawer is divided into front and back portions 38 and 39 by a partition 40. This partition is provided with a notch 41 in each vertical edge to receive the channel 24, the partition being maintained in a vertical position in the drawer by gravity, the upper edge of the notch 41 resting on the channel, as in Fig. 2, which point of support is considerably above the center of the partition. The upper edge of the partition reaches practically to the cover 35, as in Fig. 1, while the lower edge reaches practically to the bottom. The relative sizes of the compartments 38 and 39 can be varied by moving the partition along the channel 24. At each end the channel 24 is cut short, leaving a narrow recess 42 into which the partition 40 can be dropped and then slid onto the channel. If desired two or more partitions may be used.

It will now be seen that when the drawer is closed it is entirely surrounded by a space, which space is not only cut off from the space surrounding the housing, but it is also cut off by the cover 35 from the interior of the drawer. Furthermore, the components of this surrounding space are intercommunicating. That is, the space 25 below the drawer is connected with the space 43 above the drawer, at the rear by the space 26, and at the front by the holes 32 near the upper and lower horizontal walls 31, and the space 44 between walls 20 and 30. The space 25 is also connected to the space 43 by spaces 45 between side walls 13 and 22 on each side of the drawer, the upper and lower portions of the spaces 45 being connected by the recesses formed by the interruptions 19 in the channels 18. The spaces 45 are also connected to the space 46 by the vertical rows of holes 32, one of which holes is seen in Fig. 3.

The interior of the drawer is not entirely cut off from the enveloping space just described, as there are holes 46 in the lower member of each channel 24 (see Figs. 2 and 3) which holes are so positioned that when the drawer is closed they open into the spaces 19. Nor is the enveloping space quite cut off from the outside of housing 10. A removable plug 50 is inserted in the top of the housing near the open end, and a small projection 51 extends upward from the back 21 of the drawer in longitudinal alignment with the plug 50. When the drawer is pulled nearly out the lug 51 engages the plug 50 and stops movement of the drawer. When it is desirable to entirely withdraw the drawer the plug is removed. A hole 52 extending vertically through the plug forms a vent for the enveloping space.

In Fig. 10 I show an apparatus of modified construction whereby my method can be successfully carried out. This structure comprises a housing 90 and a drawer 91. At their upper edges the side walls of the drawer are bent outward to form horizontal flanges 92, which repose between guide strips 93 secured in the upper part of the housing. A cover 94 lies on the flanges 92, and communication between the space 95 below the flanges and the space 96 above the cover is effected by holes 97 in the flanges 92 and the contiguous part of the cover. The bottom of the housing 90 is provided with circular openings, the edges of which are bent upward to form annular flanges 98, which support water pans 99.

I shall now explain the manner of using my apparatus. While the outside container may be kept in a cool storage space, maintained above a temperature of 32° and lower than 75° F. the apparatus disclosed in the drawings is deposited in the food storing compartment of a refrigerator, preferably a mechanical refrigerator, and either the recesses 17 may be filled with water, or pans 53 may be filled with water and set in the recesses. This water will not freeze, because the temperature of the food storing compartment of a refrigerator is never below 32° F. nor above 60° F. For the present it will be supposed that some loaves of bread as tall as the interior of the drawer are deposited in the compartment 38 and that the partition 40 is moved up close to the bread. In other words, the compartment is filled with bread. It is not to be supposed that literally all of the space in the compartment is filled; that would not be practicable. But, assuming that the compartment is to accommodate standard loaves of a given size, the height and width of the drawer may be made such as will receive these standard loaves, as they run from day to day, leaving no unnecessary space. The remaining dimension is obtained by placing the partition, according to whether one or more loaves are put into the compartment.

Water in the pans 53 will evaporate and fill the enveloping spaces, i. e., the spaces 25, 26, 43, 44 and 46 with cold humid air. Thus the drawer will be entirely enveloped in a stratum of humid air. This envelope of cold moist air greatly retards evaporation of the moisture in the bread enclosed in the drawer. The tendency to evaporate moisture from the bread is further retarded by the paucity of unoccupied space in the chamber occupied by the bread. Keeping the space full of bread greatly retards circulation of air therein, and thus tends to prevent evaporation of moisture from the bread. If some of the bread is removed from the compartment the size of the compartment is reduced by moving the partition, so that at all times the amount of unoccupied space in the compartment shall be as small as it is practicable to keep it.

It is to be understood that it is not my aim to supply new moisture to replace moisture that has left the bread. But rather to produce an environment for the bread that will reduce as much as possible the evaporation of moisture contained in the bread when placed in the drawer. In other words, the aim is to maintain as nearly as possible the state of the bread at the time it is put into the drawer. This is especially important in certain classes of bread-stuffs. Take for example soda crackers, which contain but little moisture. Not only is it desirable to retain in the crackers what moisture they contain in the beginning, but it is desirable to prevent their absorbing any moisture. I shall now explain the operation of my apparatus.

The atmosphere in a space cooled by mechanical refrigeration is so dry that it tends to draw moisture from articles exposed to it. While my housing 10 is well closed, it is not so tight but that the dry air surrounding it can draw moisture from within it. In fact, it will be recalled that I provide the vent 52 through which moisture can be drawn, in addition to what moisture escapes between the walls of the housing and the walls 31 carried by the cover of the drawer. Therefore there is a constant loss of moisture from the space enveloping the drawer, to the atmosphere enveloping the housing, which loss is made up by evaporation of water in the pans 53.

To prevent absorption of moisture from the bread in the drawer it is only necessary to keep the atmosphere in the space enveloping the drawer sufficiently humid to make the absorptivity of the enveloping atmosphere almost nil. The bread in the drawer does not draw moisture from the enveloping space because the air surrounding the housing offers more attraction for moisture than the bread. Therefore the only thing that could cause moisture to invade the drawer would be in case the atmospheric pressure in the enveloping space exceeded the pressure in the drawer, and this is prevented by the vent 52. Another use for the vent 52 is to provide for escape of gas from the drawer should it be needed, as, for instance, in case bread were put into the drawer so soon after leaving the oven that all the gas from the yeast had not yet escaped from the bread. In such a case the gas would leave the drawer through the holes 46 and leave the housing through the vent 52.

While I prefer to use a mechanical refrigerator in the practice of my method, it is not to be understood that the practice of the method is thus limited. The principal reason a mechanical refrigerator is preferable to an iced refrigerator, is that the former can be maintained at a lower temperature than the latter, thereby affording better protection from the propagation of mold or other bacteria. In fact my method can be successfully practiced in any way which affords means for keeping the temperature of the bread low enough to prevent, or even delay, molding. That is, while a temperature of 33° F. will prevent molding for a long time, it is useless to maintain so low a temperature if the bread is to be kept for only a reasonable length of time; say a few days, or a week or two.

From the preceding three paragraphs it is seen that while the bread is not confined in an air tight recess, it is protected from the drying affect of the refrigerator air by the drawer being enveloped in an atmosphere that is more humid than that of the air in the drawer. While an enveloping atmosphere of sufficient humidity for the operation of my method may be maintained by filling the pans 53 with water or other suitable liquid, and depending upon the evaporation that will take place notwithstanding the low temperature which the liquid will eventually attain, the efficiency of my method may be increased by increasing the evaporation.

There are various ways in which the evaporation can be increased or controlled. One simple way is to change the water in the pans from time to time, replacing the water removed from the pans with water of higher temperature; say, from 20° F. to 25° F. higher. Another way would be to provide the pans with electrical heating devices adapted to keep the water in the pans at a temperature that will cause a required evaporation. If desired the electric current in the heaters might be subject to regulation in order to maintain a predetermined state of humidity in the enveloping atmosphere. As to do all of this is within the ability of any mechanic skilled in the art to which it appertains, it is deemed unnecessary to illustrate it or describe it in fuller detail.

In Fig. 10 I illustrate a means for producing very much evaporation at the beginning of a period. For instance, if the apparatus has been out of use for a time it may be desirable to prime it, so to speak, by producing a much greater amount of evaporation immediately the fresh bread is put into the drawer than need be maintained later on. For this purpose I stand in the space 95, on either or both sides of the drawer, a member 100 made of wire gauze. Filling the pan 99 with warm water will cause vapor to condense on the gauze, which condensation will evaporate, thereby quickly making the atmosphere very humid. By the time this has occurred the gauze will have dried, but thereafter the evaporation from the surface of the water in the pans will be sufficient to maintain the needed humidity in the enveloping space. In Fig. 4 I show another means of controlling the evaporation, which consists in a sheet of wire gauze to be laid over the depressions 17. If desired a separate piece of gauze may be used on each depression, and they may be placed more or less to one side of the depressions, as desired.

In Fig. 7 I illustrate various forms of partitions adapted to subdivide the drawer, thereby enabling a housekeeper to accommodate articles of various sizes and shapes therein, it being remembered that it is desirable at all times to avoid an excess of space in a compartment containing an article of bread. It is also to be remembered that the term bread is used in a broad sense. That is, one of the compartments shown in Fig. 7 may contain ordinary bread, another may contain crackers or cookies, another sponge cake, and so on through the entire category of articles of the general character of bread. Nor is my invention limited to use for maintaining the freshness of bread, for it may be used for keeping cereals, such for example as puffed rice, shredded wheat biscuits, and the like.

But little need be said by way of description of the partitioning arrangement shown in Fig. 7. At 60—60 I show T-shaped partitions which may be placed in various positions with the stems of the T's in contact, to form compartments of different lengths. The partitions 61 and 62 are merely vertical plates bent to form feet on which to stand. The partition 62 is shown in perspective in Fig. 9. In Fig. 8 I show still another arrangement, whereby the height of the drawer is subdivided. This arrangement comprises a plate 63 with upturned flanges 64—64 at two sides, the upper edges of which flanges are bent to form narrow horizontal flanges 65 that rest on the channels 24. A flat plate lying on the flanges completes the division of the drawer into three tiers. Obviously, the arrangement shown in Fig.

7 may be combined with that shown in Fig. 8 to divide the drawer into a great many compartments, each adapted to accommodate a particular mass of bread which will practically fill the space it occupies.

While the housing 10 may be set on one of the shelves, I prefer to hang it in the refrigerator in such manner as will not obstruct a shelf. One way of doing this is shown in Figs. 5 and 6. Fig. 6 is a view looking down on the top of the housing 10, to which is secured a plurality of circular lugs 75, each lug having a screw-threaded hole in its center. Into four of these lugs hooks 76, having threaded shanks, are screwed, which hooks are intended to engage rods 77 of a shelf, as in Fig. 5. An excess of lugs 75 is supplied, spaced in various positions, so at least three can be found which will be in a suitable position to receive a hook that can engage a shelf rod.

Still another arrangement for hanging the housing to a shelf is shown in connection with Fig. 2. At the right hand side of this figure a hanger 80 is shown, the upper end of which has a hook 81 that engages a bar 82 forming part of a refrigerator shelf. At its lower end the hanger has a hook 83 that embraces the channel 16. Of course, there is another hook 80 behind this one, and on the left hand side of the housing there will be a similar series of these hooks, similarly supported. By this means the apparatus can be put in just the desired position, it being only necessary to make the hooks the required length.

Another possible modification would be to provide an insulating covering for the drawer, to prevent changes in the vapor content of the air in the drawer due to sudden temperature changes in the refrigerator, as for instance, when the refrigerator door is opened. Preferably this covering would be on the outside of the drawer and might consist of a layer of cork or of any of numerous well known insulating materials.

While I have illustrated and described what at this time I regard as the preferred apparatus for carrying out my method of maintaining the freshness of bread, I do not wish it understood that in the practice of my method I am limited to the apparatus shown. My invention is only limited by the appended claims, which are as follows.

I claim:

1. The method of maintaining the freshness of bread, which comprises depositing the bread in a closed container approximately the size of the mass of the bread, depositing said container in a second container enough larger than the first to leave a space therebetween, providing for evaporation of liquid in said space whereby to maintain an atmosphere therein more humid than the atmosphere in the bread container, and providing for producing an excessive evaporation of liquid when bread is first deposited in the container.

2. The method of maintaining the freshness of bread, which comprises depositing the bread in a closed container approximately the size of the mass of the bread, and keeping the container in an atmosphere more humid than the atmosphere in the container.

3. The method of maintaining the freshness of bread, which comprises depositing the bread in a closed container approximately the size of the mass of the bread, depositing said container in a second container enough larger than the first to leave a space therebetween, which space is kept filled with atmosphere more humid than the atmosphere surrounding the bread.

ROBERT W. RITZERT.